Figure 1A:
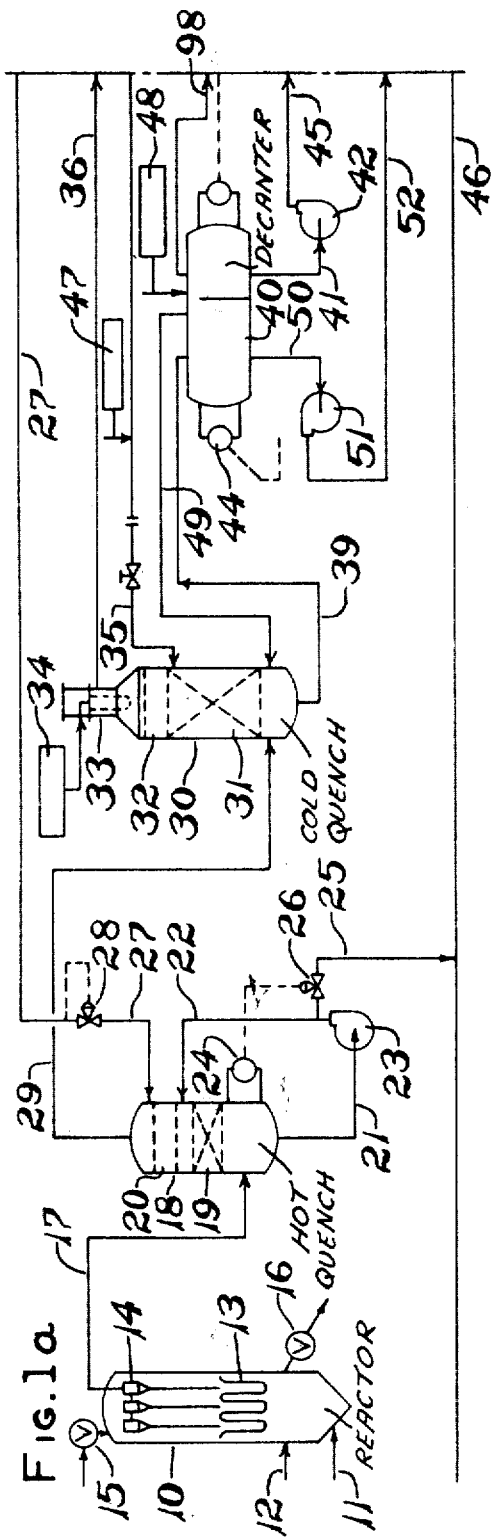

Jan. 6, 1970  J. W. HARPRING ET AL  3,488,398
METHOD OF PREPARING 1,2-DICHLOROETHANE
Filed April 23, 1964  2 Sheets-Sheet 1

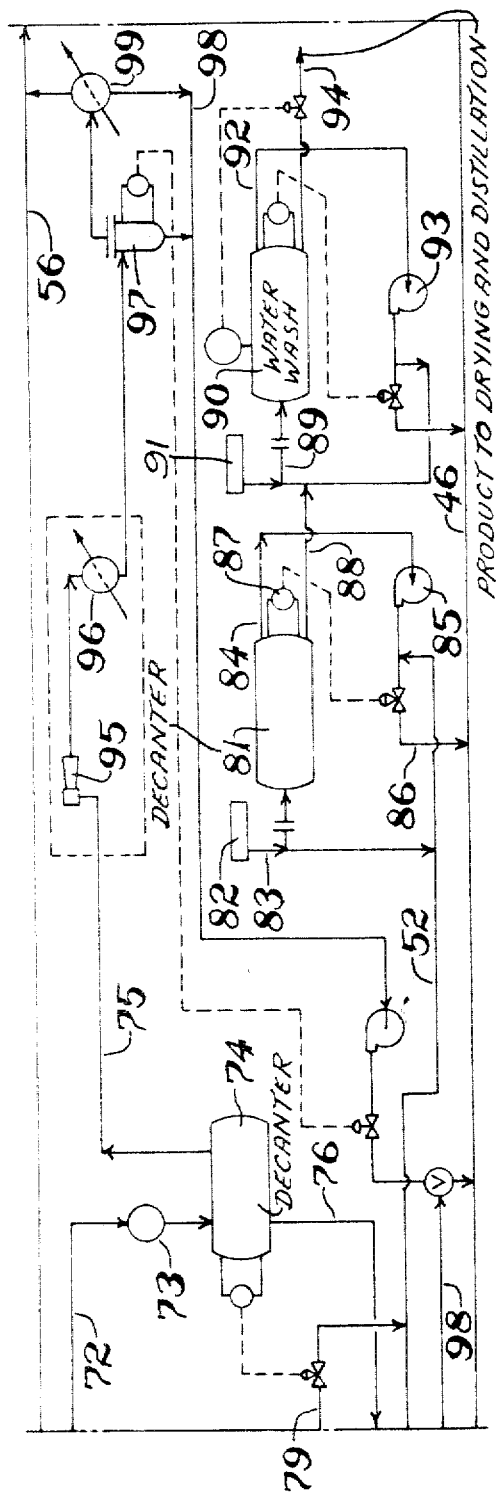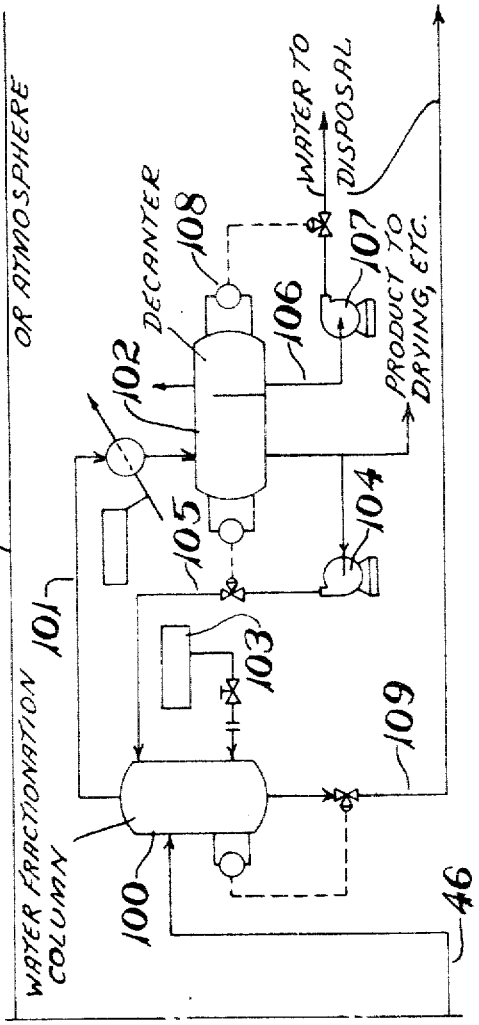

3,488,398
METHOD OF PREPARING 1,2-DICHLOROETHANE
Jerome W. Harpring and Arthur E. Van Antwerp, Avon, Robert F. Sterbenz, Garfield Heights, and Tzu Liang Kang, Brecksville, Ohio, assignors to The B. F. Goodrich Company, New York, N.Y., a corporation of New York
Filed Apr. 23, 1964, Ser. No. 362,084
Int. Cl. C07c *17/08*
U.S. Cl. 260—659                                   1 Claim

ABSTRACT OF THE DISCLOSURE 1,2-dichloroethane or "EDC" is made in a highly pure form by a one-pass or non-recycle process in which a dry mixture of hydrogen chloride, ethylene and an oxygen-containing gas such as air, preferably preheated to a temperature in the range of 150° to 200° C., is passed through a fluidized bed of a copper halide on alumina catalyst at a temperature and pressure selected in the range of 190° to 250° C. and 10 to 50 p.s.i.g. so as to maintain the vapors in the reactor above the dew points of the reactants and of the EDC product (i.e. no liquid in reactor). Reactant ratios are selected in the range of hydrogen chloride:ethylene:oxygen of 2:1.02:0.55 to 2:1.20:0.90 so as to substantially completely consume the hydrogen chloride and obtain high yields of EDC low in impurities. EDC product is recovered from the effluent gases first in a 2-step condensation, the first of which is a not quench at 70° to 100° C. selectively to drop out some of the water of reaction, most of the small amount of remaining hydrogen chloride and the bulk of the chloral by-product and the second of which is a cold quench at 0° to 40° C. to drop out all of the remaining water of reaction and most of the EDC. Residual EDC in the gases leaving the condensation step is stripped out by solvent extraction and the combined EDC product is washed with water. The process has low equipment costs due to lack of recycle and the use of carbon steel equipment.

This invention relates to a method for preparing 1,2-dichloroethane by oxyhydrochlorination of ethylene and more particularly refers to the process of making 1,2-dichloroethane in high yield with high purity by passing a mixture of gaseous HCl, an oxygen containing gas, and ethylene through a reactor at 190 to about 250° C., where the gases are reacted in the presence of a copper containing catalyst particularly a copper chloride catalyst, at a pressure of 10–50 p.s.i. and thereafter retained under pressure until the 1,2-dichloroethane and water are separated.

Prior processes for making 1,2-dichloroethane by reacting ethylene, HCl and an oxygen containing gas in a fluid bed system employing a copper containing catalyst each suffers from some serious shortcoming, such as loss of catalyst ranging from 0.5 to 5% per hour of operation, low conversion of HCl which requires the use of HCl resistant equipment and neutralization of unreacted HCl or its recovery for recycling, special treatment of catalyst to increase HCl conversion or use of large excesses of ethylene which then requires recovery or economic loss of the reactant and, finally, in some procedures, small quantities of undesired by-products are carried over with the crude 1,2-dichloroethane, which requires relatively expensive purification steps if the 1,2-dichloroethane is to be used for the preparation of vinyl chloride of polymerization grade. In the oxyhydrochlorination of ethylene, there are small amounts of chloral (tri-chloroacetaldehyde) formed. This compound has a tendency to form a polymer which will cause malfunctioning of recovery procedures, and clogging of equipment. The chloral can also decompose to CHCl₃, which makes purification more difficult. By the use of the process of this invention, the major part of the chloral is dissolved or decomposed shortly after leaving the 1,2-dichloroethane synthesis reactor.

The process of this invention comprises the following steps:

(1) Passing ethylene, HCl and an oxygen containing gas through a bed of cupric chloride containing catalyst under pressure of 10–50 p.s.i.g. and at a temperature of from about 200–250° C. The pressure temperature relationship must be such that the vapors leave the reactor above the dew point temperature.

(2) Subjecting the effluent from the reactor to a hot quench under pressure, wherein practically all unreacted HCl, a high proportion of the chloral formed during the reaction, and some of the water of reaction are condensed.

(3) Removing gases from the hot quench stage at a temperature of 70–100° C., and lowering the temperature to 0–40° C., to condense any remaining water and most of the 1,2-dichloroethane while venting the uncondensed gases under controlled pressure.

(4) Absorbing the remaining 1,2-dichloroethane under pressure in a solvent.

(5) Purifying the 1,2-dichloroethane.

The overall reaction for converting ethylene to 1,2-dichloroethane can be written empirically as follows:

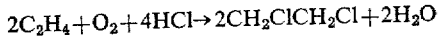

$$2C_2H_4 + O_2 + 4HCl \rightarrow 2CH_2ClCH_2Cl + 2H_2O$$

In the reaction, however, some ethylene is converted to higher chloride containing materials and some is oxidized to CO and CO₂ and for this reason it is preferred to use slightly more ethylene and oxygen than stoichiometrically required. Thus, for each two moles of HCl from about 1.02 to about 1.2 moles of ethylene and from about 0.55 to about 0.9 mole of oxygen are preferably fed into the reactor in order to maximize utilization of the HCl. A preferred oxygen concentration is an intermediate range of from 0.75 to 0.80 mole for every 2 moles of hydrogen chloride.

The most preferred ethylene, oxygen and HCl molar ratios are 1.1/0.8/2.0.

The catayst is preferably a copper halide, and more particularly cupric chloride, carried on a support to aid in is fluidization. Typical supports are silica, kieselgühr, fuller's earth, clay and alumina. Of these supports, alumina is preferred because of its resistance to attrition, its ability to fluidize and especially because it can be prepared in the proper ratio of particle sizes which are important in providing proper fluidization characteristics to the catalyst to insure adequate contact between the catalyst and reactants and also to minimize loss of fines by passage of the fine catalyst particles from the reactor. For good fluidization, it is essential to have at least about 20% of the weight of the catalyst of 45 micron diameter or smaller, and preferably 30–35% of the catalyst should be in this particle size range. It is desirable to limit the portion with particle size below about 20 microns to not more than 3–10% by weight and the maximum particle size should not exceed about 200 microns, the weight percent of which desirably should not exceed about 3–5%. Representative particle size analysis for good alumina catalyst supports are as follows.

(1)       Bayer process activated alumina

| Greater than: | Percent |
|---|---|
| 177 microns | 4.2 |
| 149 microns | 7.8 |
| 74 microns | 50.1 |
| 44 microns | 29.2 |
| Less than 44 microns | 8.7 |

An alumina of this type contains about 90% Al₂O₃ 0.5% Na₂O and the remainder essentially moisture. The material has a surface area of 150–250 sq. meters per gram, and bulks at 7.4 pounds per gallon.

A representative microspheroidal gel alumina containing 96–97% $Al_2O_3$ and the balance essentially moisture, with a surface area of 125–200 square meters per gram, a bulk of 8 pounds per gallon and a pore volume of 0.49 to 0.51 cc. per gram has the following range of particle sizes by weight:

| More than: | Percent |
| --- | --- |
| 80 microns | 24 |
| 40–80 microns | 41 |
| 20–40 microns | 29 |
| Below 20 microns | 6 |

The catalyst is prepared by mixing a solution of copper halide, preferably cupric chloride, and the requisite amount of carrier, stirring for about an hour, filtering, drying at a temperature of 100–120° C., and screening through a 20 mesh (U.S. Sieve) Screen. In one representative formulation 50.7 pounds of $CuCl_2 \cdot 2H_2O$ dissolved in 49.3 pounds of distilled water are mixed with 50 pounds of the Bayer type alumina, then filtered, dried and screened.

The amount of copper salt on the catalyst can vary between 3.0 to about 12% by weight of copper, but the preferred range is from about 3.5 to about 7% by weight. Amounts greater than 12% by weight of copper can be used in the catalyst, but does not improve reaction rates and has a greater tendency to cake in the reactor.

Referring to the drawing, FIGURES 1a, 1b, 1c and 1d, in that order and in horizontal sequence, represent a complete flow diagram.

A mixture of air or oxygen and an inert diluent and dry HCl in proportions sufficient to provide about 0.5 to about .9 mol of oxygen for each 2 moles HCl is prepared and preferably preheated to 125° C., or up to the reaction temperature before being fed into reactor 10 through line 11. Ethylene, preferably preheated to 125° C., or up to reaction temperature, is fed into reactor 10, through line 12. A preferred preheat range is from 150° to 200° C. Care should be exercised to avoid formation of an explosive mixture of oxygen and ethylene. For this reason, the HCl and oxygen containing gas are fed into the reactor through a single line so that the requisite amount of HCl is always present when the oxygen containing gas gains contact with the ethylene.

Reactor 10, may have a heat control coil 13, attached to an outside source of heat exchange, to preheat the reactor to reaction temperature and thereafter aid in controlling the temperature therein. The heat exchange medium can be steam or, a circulating liquid which can be heated to 250° C., a representative being a heat stable mineral oil. The reactor is charged with rerequisite amount of a fluidizable cupric halide catalyst which is kept in a fluidized state during the entire operation. The reactor also contains one or more cyclones 14, to separate the catalyst fines from the effluent gases and retain the catalyst in the reactor. Catalyst can be initially charged through line 15, from the hopper (not shown). The reactor also has a valve 16, near its base to drain spent catalyst when this is necessary.

During operation, a temperature of 190–250° C., and a pressure of 10–50 p.s.i. is maintained in the reactor. This provides a contact time of from about 10 to about 40 seconds. Because the reactants are fed into the reactor in a dry state and the pressure-temperature relationship are such that the dew point temperature is always exceeded in the reactor, is is possible to fabricate the reactor with carbon steel. If desired, however, the reactor can be made from an HCl resistant material such as steel with a ceramic lining, alloys sold as Karbate or stainless steel. Also, by operating above the dew point temperature, there is practically no tendency for catalyst to cake and develop "hot spots." Tests have shown that not more than 0.5% of the initial catalyst charge is removed from the reactor as fines in a 24 hour period. The complete lack of liquid in the reactor prevents leaching out of catalyst from the support.

The effluent gases leave the reactor 10, through line 17, and are fed into the hot quench column 18. This column has a packed section 19, and a plate section 20. In plate section 20, of the column, a portion of the sensible heat is removed, so as to condense some water and essentially all traces of unreacted HCl. Little or no 1,2-dichloroethane is condensed. Condensation of part of the water in the column reduces the temperature of the gases taken off over head to 70–100° C., but preferably above 85° C. The condensation takes place in both the packed section and plate section of the column. To aid in this partial condensation step, the water containing absorbed, unreacted HCl and any catalyst fines, passes through line 21 and a portion is pumped back through line 22 by pump 23, to act as reflux for this packed section of the column which is operated at approximately the boiling point of the water-HCl mixture. The amount of liquid returned to the column is regulated by level control device 24, which is connected to line 25, by a pressure controlled valve 26, to maintain the level in column 18 at the requisite value.

In the plate section 20, of the column 18, water is fed through line 27 to the top of the plates after prior passage through a level control valve 28 which is cooperatively connected with a level control device 44 of decanter 40. The amount of water is controlled, so as to remove substantially all the unreacted HCl but little or no 1,2-dichloroethane. The gas stream leaving column 18, through line 29, should have a temperature of about 70 to about 100° C., and preferably 85–95° C.

In this reaction there are produced small amounts of impurities, such as chloral (trichloroacetaldehyde). About 75% of the chloral entering the hot quench column is removed here. The chloral although only present in amounts of .02–2% or less of the effluent stream from the reactor, is known for its propensity to polymerize, especially in strongly acid media. The polymer, if permitted to accumulate, would clog and foul subsequent lines and operating controls and therefore, it is desirable to remove it at the earliest possible stage. The hot quench column also eliminates the need for an acid resistant heat exchanger or a filter to remove catalyst fines. Filter screens clog easily and any unreacted ethylene could burn in the presence of oxygen and catalyst on a clogged screen and make shutdowns frequently necessary.

The hot quench column is desirably made of acid brick lined carbon steel, but it can be made from HCl resistant metal such as Monel metal, where expense is not a controlling consideration.

The stream leaving column 18 through 29 enters the lower portion of cold quench column 30. This column contains a packed section 31, a plate section 32 and a condenser 33, through which a cooling medium is circulated from a refrigerating source 34. The cooling medium can be cold water, or brine or any other cooling liquid.

In column 30, most of the water and 1,2-dichloroethane are condensed.

Figure 1B:
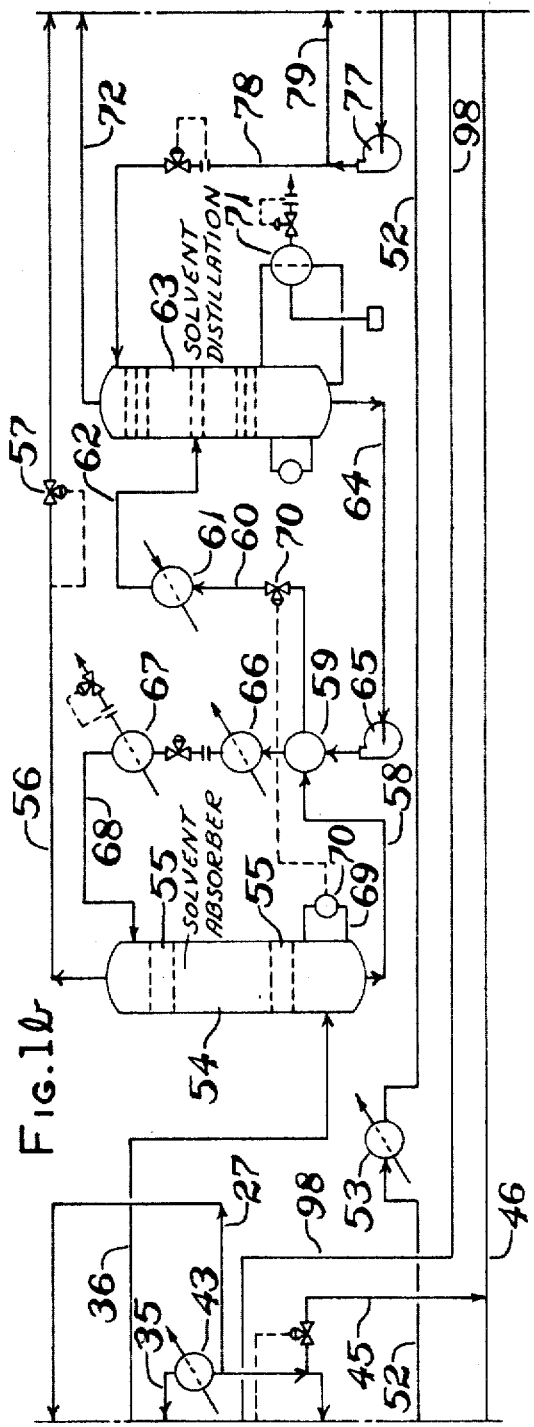

Gases entering through line 29 pass over the packed section 31 and are partially condensed by cold water entering through line 35. Condensation is completed in plate section 32, which holds part of the condensate formed by contacting the condenser 33. The gases which remain uncondensed pass out of the column through line 36. The pressure is maintained in the reactor by external means through pressure control valve 57 (FIG. 1b).

The condensate passes through line 39 into decanter 40, where an aqueous layer and an organic layer and formed. The aqueous layer passes through line 41, pump 42, heat exchanger 43 (FIG. 1b), where it is cooled to the desired temperature and returned to column 30 through line 35 or to the hot quench column 18, through line 27. A level control device 44, operates to discharge the excess water (net yield) through line 45 into line 46. Line 35 is connected to a source of caustic 47, which can be used in emergency situations if one of the controls fail to function in the hot quench or during periods of start up before ethylene is added to the reactor or during the period when equilibrium is being established in the reaction.

Decanter 40, is connected to a source of water 48, in the event that there is need for additional washing of the 1,2-dichloroethane at this stage, or in the event that additional water is needed in column 30. Line 49, serves to recirculate water directly from the decanter 40, to column 30.

The condensed 1,2-dichloroethane is removed from decanter 40, through line 50, passes through pump 51, to line 52, having heat exchange 53, to a washing train, described hereinafter.

The non-condensed gases which exit through line 36, are fed into an absorbing unit 54 (FIG. 1b), which can have one or more plate sections 55. The absorbing medium is preferably a liquid hydrocarbon which will dissolve the remaining 1,2-dichloroethane, and which boils at 100 to 250° C. The solvent can be kerosene, toluene, chlorinated liquid aromatic compounds such as chlorobenzene or chlorotoluene or high boiling petroleum factors and the like. Because of its cost, kerosene is preferred. The unabsorbed gases, consisting mainly of unreacted oxygen, nitrogen if air is used, or if nitrogen is used as a diluent in the reaction, the rare gases of air, carbon monoxide and $CO_2$, leave the absorber through line 56, passes through a pressure control valve 57, and are vented for disposal either through an after-burner to get rid of traces of absorbent or to the atmosphere.

The absorbed mixture of 1,2-dichloroethane in the hydrocarbon is passed through line 58, heat exchanger 59, and line 60 into heat exchanger 61, and line 62 to a fractionating column 63. The column can be operated at atmospheric, superimposed pressure or under a partial vacuum. Usually the column is operated under a partial vacuum, usually at 3–10 p.s.i. The bottoms from the distillation column pass through line 64 and are recirculated through absorber 54, by passing through pump 65, heat exchangers 66, 67, where the absorbing medium is cooled to the requisite temperature and fed back into the absorber 54, through line 68. The absorber 54, also has a level control device 69, cooperatively connected with valve 70, to maintain the level of the hydrocarbon absorbent in absorber 54, and distillation column 63, at the proper value. Column 63, is also equipped with a reboiler 71, to maintain proper temperature at the bottom of the distillation column. Vapors from column 63, containing mostly 1,2-dichloroethane and some other low boiling fraction pass out of the column through line 72, enter condenser 73 (FIG. 1c) where they are liquefied and pass into decanter 74. Unliquefied gases leave decanter 74, through line 75, from which they can be vented for disposal as hereinafter described. The 1,2-dichloroethane from decanter 74, passes through line 76, to pump 77 (FIG. 1b). A portion of the condensate is then pumped through line 78, as reflux to distillation column 63, and another portion is fed into line 79, which is connected to line 52 (FIG. 1c), leading to decanter 81. In the event that neutralization is needed, caustic from tank 82 is fed into decanter 81, through line 83. Water is withdrawn through line 84, by pump 85, and fed into line 86, which is connected with line 46. A level control device 87, prevents water from entering line 88, to contaminate the crude 1,2-dichloroethane which is fed into line 89, into a vessel 90, where it is washed with water from tank 91. The water is withdrawn from vessel 90 through pipe 92, and can be recirculated through line 89 by pump 93, or co-mingled with the remaining wash water in line 46. The crude 1,2-dichloroethane is withdrawn from vessel 90, by means of line 94, and sent to drying and purification station.

Vapors from decanter 74, are removed with a steam ejector 95, passed through a condenser 96, and into tank 97. The liquid then can be recycled to decanter 40 through pipe 98 or into line 46 for stripping and the vapors passed into the atmosphere or burned by passing them through heat exchanger 99, and to line 56.

The combined wash water enters fractionating column 100 (FIG. 1d) through line 46, and the 1,2-dichloroethylene is stripped and passed through line 101, to decanter 102 after condensation. The water in distillation column 100, is neutralized, if needed, by the addition of caustic from tank 103.

From decanter 102, a portion of the 1,2-dichloroethylene is recirculated as reflux by means of pump 104 and line 105 and the water is removed through line 106 and pump 107 and sent to a disposal system. The proper liquid level in decanter 102 is maintained by level control device 108. Bottoms from the column pass through line 109 and are neutralized if necessary by the use of aqueous alkali.

The following examples as for illustrative purposes and are not intended to be limitations of this invention.

EXAMPLE I

The reactor 10 was a carbon steel structure with an over-all height of 29 feet, 8½ inches. Approximately 21 feet had an inner diameter 10 inches, and thereafter the top was flared at about 60 degrees to provide a section having an inner diameter of about 18 inches and a height of 6 feet, 3 inches. The flared section had a cyclone 14, the leg of which extended to about 6 feet above the bottom of the reactor. The cyclone was used to collect catalyst fines and return them to the reaction area. The reactor was equipped with three cooling coils 13, each about 12 feet in length and 1 inch outer diameter for circulating a heat transfer medium during the reaction. One coil was made from schedule 40 carbon steel, another from Monel metal and the third from nickel.

The reactor base also had a distributor plate containing four openings for feeding and distributing a mixture of air and HCl vapor, preheated to 150° C., and a manifold for feeding and distributing ethylene also preheated to 150° C., so that the ethylene would be thoroughly blended with the air-HCl mixture as soon as contact was made with the catalyst.

The catalyst was made by dissolving 35 pounds of $CuCl_2 \cdot 2H_2O$ in 75 pounds of water, adding 50 pounds of microspheriodal alumina powder, having the particle size distribution referred to above, thoroughly mixing for about an hour, filtering, and air drying the filter cake at 100–120° C. The dry catalyst was then screened. This catalyst contained 10% by weight of copper.

After adding the requisite amount of catalyst to the reactor, a mixture of 2 gram moles of dry HCl and .754 gram mol of oxygen, supplied as air, was preheated to 150° C., and run into the reactor through line 11. The pressure in the reactor was adjusted to about 35 p.s.i.g. After the catalyst bed was properly fluidized and the temperature adjusted to about 216° C., ethylene preheated to 150° C., was fed into the reactor through inlet 12 in a quantity sufficient to provide 1.116 gram mols for each 2 mols of HCl. The reactor temperature was held at 216–220° C., for 39 hours. The temperature was controlled by pumping a heat stable petroleum oil through coil 13 to absorb the heat of reaction. The fluidized catalyst bed height under these conditions was 21.9 feet. The space velocity of the gases was calculated to be .72 ft./sec. and contact time was 30.6 seconds.

Vapors leaving reactor 10 are fed into the hot quench column 18, wherein the temperature was held at about 93–94° C., to condense a part of the water and dissolve a large amount of the unreacted HCl therein as well as 75-80% of the chloral by-product. Vapors leaving the hot quench column are fed into cold quench, column 30, where temperature is dropped to 5-10° C., to condense the ethylene dichloride and remaining water. Even during start up, the HCl was practically completely reacted so that the liquid in the hot quench column require no neutralization with caustic. The condensate from the cold quench column is passed to decanter 40 and washed with water. A portion of the water from decanter 40 is recirculated as reflux to the hot quench column 18 through line 27. Vapors from the cold quench are fed into ab-absorber 54 which contained kerosene as the absorbing fluid. The kerosene with the absorbed organic materials is fed into fractionating column 63 to strip 1,2-dichloroethane. The stripped kerosene is returned to the absorber. The vapors from the stripping column are condensed and fed into decanter 74. Uncondensed gases are vented through line 56, as heretofore described. The 1,2-dichloroethane is then sent to decanter 81 and finally to vessel 90, where additional washing and/or neutralizing, if needed, are effected. The wash waters are collected in line 46, and the 1,2-dichloroethane is removed therefrom in column 100, separated from water in decanter 102 and thereafter further purified and dried when necessary. All non-condensibles are finally passed out through vent line 56.

With the procedure 99.92% of the HCl and 90.0% of the ethylene were converted with 1,2-dichloroethane yields of 99.01% based on HCl converted and 93.95% based on ethylene converted were obtained. The 1,2-dichloroethane produced had a purity of 99.53%. Productivity of 1,2-dichloroethane was 9.79 pounds/cu. ft. reactor capacity. Only very small amounts of chlorinated by-products were formed. These included .002% vinyl chloride, .042% ethyl chloride, 00.2% trans 1,2-dichloroethylene, .002% dichloroethane, .101% of a mixture of chloroform and cis-1,2-dichloroethylene, .010% trichloroethylene, 0.37% chloral, .190% 1,1,2-trichloroethane, .014% tetrachloroethylene and .009% of a mixture of 1,2,3-trichloropropane and tetrachloroethane.

The gases vented into the air contained 3.7% oxygen, 90.9% nitrogen, 1.0% carbon monoxide, 3.2% carbon dioxide, 4.3% ethane and only minute traces of chlorinated hydrocarbon.

A number of additional runs were made with this same catalyst. The data obtained are shown in Table I.

TABLE I

| | Run number | | | |
|---|---|---|---|---|
| | 2 | 3 | 4 | 5 |
| Hours run | 84 | 16 | 24 | 48 |
| Temp., ° C | 217-224 | 220 | 225 | 226 |
| Pressure, p.s.i.g | 36 | 18.5 | 36.4 | 36.0 |
| Catalyst bed height, feet | 19.3 | 18.3 | 18.4 | 17.2 |
| Average EDC¹ purity | 99.08 | 99.04 | 99.03 | 98.93 |
| Feed ratio: | | | | |
| $C_2H_4$ | 1.167 | 1.220 | 1.24 | 1.254 |
| HCl | 2.000 | 2.00 | 2.00 | 2.00 |
| $O_2$ | .808 | .73 | .76 | .846 |
| Velocity, ft./sec | .67 | .89 | .66 | .66 |
| Contact time (sec.) | 28.7 | 20.5 | 27.6 | 25.9 |
| Productivity EDC, lbs./hr./ft.³ | 9.69 | 10.3 | 10.82 | 9.55 |
| Conversion: | | | | |
| HCl | 99.91 | 98.68 | 99.82 | 99.2 |
| $C_2H_4$ | 87.54 | 81.97 | 87.33 | 81.71 |
| $O_2$ | 92.74 | 60.29 | 76.04 | 82.13 |
| Yield: | | | | |
| HCl | 98.77 | 98.90 | 98.73 | 98.68 |
| $C_2H_4$ | 92.09 | 97.50 | 90.77 | 95.51 |
| $O_2$ | 64.15 | 100 | 84.80 | 70.41 |

¹ EDC=1,2-dichloroethane.

These data show that excellent conversion and yields of very high purity 1,2-dichloroethane and unusually high productivity per cubic feet of reactor space can be obtained by the process of this invention, over a fairly wide range of pressures and contact time.

EXAMPLE 2

In this series of runs the catalyst contained about 10% copper on a Bayer process alumina support having the particle size distribution described above. For preparing this catalyst, 50.7 pounds of $CuCl_2 \cdot 2H_2O$ are dissolved in 49.3 pounds of dimineralized water and 50 pounds of the alumina are added thereto. The slurry is mixed for one hour then filtered, dried at 100-120° C., and screened. The difference in amount of $CuCl_2$ needed as compared to that shown in Example I is due to the large surface area per unit weight of the Bayer process alumina.

The procedural steps used in these runs are the same as those already described in Example I. Data obtained in these runs are listed in Table 2.

TABLE 2

| | Run number | | | | |
|---|---|---|---|---|---|
| | 1 | 2 | 3 | 4 | 5 |
| Hours run | 24 | 40 | 24 | 60 | 24 |
| Temp., ° C | 220 | 221 | 227 | 213 | 220 |
| Pressure, p.s.i.g | 35 | 35 | 35 | 35 | 35 |
| Catalyst bed, height/feet | 18.5 | 20.6 | 18.3 | 18.5 | 17.5 |
| Average EDC purity | 98.83 | 99.13 | 99.13 | 98.69 | 98.76 |
| Feed Ratio: | | | | | |
| $C_2H_4$ | 1.02 | 1.07 | 1.09 | 1.077 | 1.091 |
| HCl | 2.00 | 2.00 | 2.00 | 2.00 | 2.00 |
| $O_2$ | .74 | .74 | .74 | .748 | .752 |
| Velocity, ft./sec | .72 | .68 | .69 | .69 | .68 |
| Contact time (sec.) | 26.4 | 30.1 | 26.4 | 26.7 | 25.9 |
| Productivity EDC, lbs./hr./ft.³ | 11.41 | 10.43 | 11.50 | 11.55 | 12.44 |
| Conversion: | | | | | |
| HCl | 99.32 | 99.03 | 99.2 | 99.17 | 99.17 |
| $C_2H_4$ | 93.26 | 98.17 | 98.13 | 97.74 | 97.40 |
| $O_2$ | | 98.84 | 98.96 | 98.51 | 98.71 |
| Yield: | | | | | |
| HCl | 98.68 | 97.57 | 96.22 | 95.79 | 96.86 |
| $C_2H_4$ | 85.92 | 87.18 | 88.86 | 89.14 | 88.81 |

These data show that even with a very low excess of ethylene over the stoichiometric amount, good yields of high purity 1,2-dichloroethane can be obtained.

With this catalyst, the amount of chloral from run 3 was .307% and from run 4, it was .252%.

In run 3, the HCl contained no organic impurities, and in run 4 was obtained from cracking 1,2-dichloroethane, so that it was contaminated with small amounts of volatile low molecular weight aliphatic hydrocarbons.

EXAMPLE 3

The reactor was the same as that described in previous examples. The catalyst, however, contained from 3.5 to 7% by weight of copper. The support in each case was a microspheroidal alumina. Results of the tests are given in the following table.

3.5% COPPER CATALYST

| | | | | |
|---|---|---|---|---|
| Reactor Temp., ° C | 232 | 222 | 221 | 217 |
| Reactor pressure, p.s.i.g | 35.0 | 37.0 | 33.5 | 35.0 |
| Catalyst bed, height/ft | 19.1 | 21.1 | 20.9 | 21.4 |
| Average EDC purity | 98.5 | 99.0 | 99.0 | 99.3 |
| Feed Ratio: | | | | |
| $C_2H_4$ | 1.06 | 1.04 | 1.07 | 1.08 |
| HCl | 2.00 | 2.00 | 2.00 | 2.00 |
| $O_2$ | 0.86 | 0.85 | 0.84 | 0.90 |
| Velocity, ft./sec | 0.70 | 0.65 | 0.68 | 0.65 |
| Contact time (sec.) | 27.3 | 32.4 | 30.7 | 32.9 |
| Conversion: | | | | |
| HCl | 99.3 | 99.3 | 97.9 | 98.6 |
| $C_2H_4$ | 98.6 | 98.8 | 97.5 | 98.1 |
| Efficiency: | | | | |
| HCl | 96.8 | 97.5 | 96.1 | 96.9 |
| $C_2H_4$ | 91.0 | 94.3 | 90.6 | 90.1 |

7% COPPER CATALYST

| | | | | | |
|---|---|---|---|---|---|
| Reactor Temp., °C | 227 | 223 | 228 | 226 | 227 |
| Reactor pressure, p.s.i.g | 35.0 | 36.0 | 37.0 | 35.5 | 35 |
| Catalyst bed, height/ft | 21.1 | 21.0 | 20 | 23 | 18.7 |
| Average EDC purity | 98.8 | 98.8 | 99.0 | 98.9 | 98.8 |
| Feed Ratio: | | | | | |
| $C_2H_4$ | 1.19 | 1.12 | 1.16 | 1.06 | 1.09 |
| HCl | 2.00 | 2.00 | 2.00 | 2.00 | 2.00 |
| $O_2$ | 0.88 | 0.87 | 0.88 | 0.89 | 0.86 |
| Velocity, ft./sec | 0.695 | 0.689 | 0.690 | 0.708 | 0.721 |
| Contact time (sec.) | 30.4 | 29.2 | 29.0 | 32.4 | 25.1 |
| Conversion: | | | | | |
| HCl | 99.7 | 99.6 | 97.5 | 97.1 | 99.7 |
| $C_2H_4$ | 99.4 | 99.4 | 97.2 | 96.8 | 98.5 |
| Efficiency: | | | | | |
| HCl | 98.0 | 98.1 | 90.1 | 95.6 | 98.5 |
| $C_2H_4$ | 82.6 | 88.1 | 82.8 | 90.5 | 89.1 |

EXAMPLE 4

The reactor for this example had a ten foot length of four inch diameter stainless steel tubing connected by a flanged, tapered adapter to a four foot length of 6 inch diameter stainless steel tubing. The stainless steel was Type 316. The premixed vapors were introduced into the bottom of the reactor through a four inch diameter, porous stainless steel sparger. The top of the reactor had an opening through which catalyst was charged and it also contained a rupture disk as a safety mechanism. Pressure in the reactor was measured by properly spaced manometers and temperature was measured by spaced thermocouples. The entire reactor was traced with steam heated coils (heated to approximately 190° C.) to avoid localized hot spots. Four separate coils were used on the section with the four inch diameter and additional coils were used in the upper six inch diameter section. Low pressure steam was used to control the reaction temperature after the proper initial temperature was reached.

The tables below give a summary of the results obtained in several runs made by the procedure outlined in Example I.

TABLE 3

|  | Run Number | | | | |
|---|---|---|---|---|---|
|  | 1 | 2 | 3 | 4 | 5 |
| Hours run | 22 | 24 | 24 | 15 | 21 |
| Temp., °C | 220 | 220 | 220 | 228 | 220 |
| Pressure, p.s.i.g | 30 | 30 | 29.5 | 29 | 28 |
| Feed Ratio: |  |  |  |  |  |
| $C_2H_4$ | 1.12 | 1.10 | 1.04 | 1.05 | 1.14 |
| HCl | 2 | 2 | 2 | 2 | 2 |
| $O_2$ | .61 | .63 | .53 | .58 | .51 |
| Bed depth (ft.) | 7.1 | 7.1 | 7.1 | 7.1 | 7.1 |
| Velocity (ft./sec.) | .33 | .34 | .51 | .53 | .50 |
| Contact time (sec.) | 21.3 | 21.2 | 14.0 | 13.4 | 14.2 |
| Conversion: |  |  |  |  |  |
| $C_2H_4$ | 87.8 | 87.2 | 81.8 | 88.3 | 84.1 |
| HCl | 94.0 | 93.2 | 81.6 | 88.1 | 89.8 |
| $O_2$ | 92.3 | 93.4 | 85.6 | 87.4 | 85.0 |
| Yield EDC: |  |  |  |  |  |
| $C_2H_4$ | 90.2 | 95.2 | 94.3 | 90.4 | 90.3 |
| HCl | 94.4 | 97.6 | 98.0 | 95.4 | 97.2 |
| Production EDC, hr./ft.³ | 10.6 | 11.0 | 14.9 | 15.7 | 15.4 |

The catalyst was made from a Bayer process alumina by the process described heretofore. It contained about 10% copper.

The next series of runs was made with a catalyst containing 12.9% copper on a microspheroidal alumina support, which has been previously described.

TABLE 4

|  | Run Number | | |
|---|---|---|---|
|  | 1 | 2 | 3 |
| Hours run | 24 | 24 | 20 |
| Temp., °C | 220 | 220 | 220 |
| Pressure, p.s.i.g | 30 | 30 | 30 |
| Feed Ratio: |  |  |  |
| $C_2H_4$ | 1.07 | 1.11 | 1.13 |
| HCl | 2.00 | 2.0 | 2.0 |
| $O_2$ | .56 | .60 | .58 |
| Bed depth | 8.5 | 8.5 | 8.5 |
| Velocity, ft./sec | .33 | .33 | .33 |
| Contact (sec.) | 25.7 | 25.8 | 20.0 |
| Conversion: |  |  |  |
| $C_2H_4$ | 87.7 | 89.0 | 86.7 |
| HCl | 92.0 | 96.0 | 95.2 |
| $O_2$ | 88.7 | 89.0 | 88.9 |
| Yield EDC: |  |  |  |
| $C_2H_4$ | 98.4 | 96.4 | 94.8 |
| HCl | 100 | 98.9 | 97.2 |
| Productivity, lbs./hr./ft.³ | 9.5 | 9.3 | 8.9 |

In the runs reported in tables a synthetic mixture of oxygen and nitrogen was employed.

Runs 1 and 2 in the following table were made with air, using a catalyst containing 10.9% copper on a Bayer type alumina. In run 3, the catalyst contained 7.4 copper and 3.6% KCl on the alumina.

TABLE 5

|  | Run Number | | |
|---|---|---|---|
|  | 1 | 2 | 3 |
| Hours run | 23 | 17 | 39 |
| Temp., °C | 200 | 220 | 232 |
| Pressure, p.s.i.g | 20 | 20 | 25 |
| Feed Ratio: |  |  |  |
| $C_2H_4$ | 1.13 | 1.13 | 1.17 |
| HCl | 2.00 | 2.00 | 2.00 |
| $O_2$ | .64 | .62 | .65 |
| $N_2$ | 2.54 | 3.23 | 2.63 |
| Bed depth (ft.) | 8.1 | 8.1 | 9.0 |
| Velocity, ft./sec | .43 | .51 | .41 |
| Contact (sec.) | 19.0 | 16.1 | 22.1 |
| Conversion: |  |  |  |
| $C_2H_4$ | 90.7 | 95.7 | 91.2 |
| HCl | 98.8 | 99.5 | 98.7 |
| $O_2$ | 88.6 | 87.2 | 87.1 |
| Yield EDC: |  |  |  |
| $C_2H_4$ | 96.3 | 91.3 | 97.3 |
| HCl | 99.1 | 99.2 | 99.3 |
| Productivity, lbs./hr./ft.³ | 11.4 | 11.2 |  |

The results of the runs summarized in Table 6 were made with a catalyst containing 3.5% copper on a microspheroidal alumina. The fluidized bed height was kept at 10 feet and the pressure was held at 25 p.s.i.g. Oxygen was supplied as air.

TABLE 6

|  | Run Number | | | | | | |
|---|---|---|---|---|---|---|---|
|  | 1 | 2 | 3 | 4 | 5 | 6 | 7 |
| Temp., °C | 225 | 225 | 225 | 225 | 225 | 230 | 220 |
| Feed Ratio: |  |  |  |  |  |  |  |
| $C_2H_4$ | 1.21 | 1.21 | 1.10 | 1.10 | 1.05 | 1.21 | 1.21 |
| HCl | 2.00 | 2.00 | 2.00 | 2.00 | 2.00 | 2.00 | 2.00 |
| $O_2$ | .75 | .65 | .65 | .85 | .75 | .75 | .75 |
| Conversion: |  |  |  |  |  |  |  |
| HCl | 99.7 | 98.3 | 98.1 | 98.8 | 97.3 | 99.5 | 99.8 |
| Yield EDC | 99.24 | 99.36 | 99.25 | 99.31 | 99.24 | 99.2 | 99.38 |

From 3 to 5% of the ethylene fed was converted to carbon oxides. Other chlorinated products of ethylene were extremely small, and usually constituted less than 0.2% of the ethylene fed.

For the purpose of decomposing any chloral that is present in the water phase obtained from the hot quench column it is desirable to raise the pH of the aqueous medium to about 10. This can be done by raising the pH of the combined wash water to about 10 with an alkali or an alkaline earth oxide, hydroxide or carbonate ammonia, ammonium carbonate or amines prior to stripping the EDC from the wash water or after the EDC is stripped therefrom and prior to disposal of the water. Preferably, the decomposition of the chloral should be effected prior to stripping the EDC from the wash water. This is readily effected by treating the combined wash water with a slurry of limestone.

Although the invention has been described by reference to certain specific examples, it is to be understood that it is also operable within the limits of the variables mentioned. The most desirable temperature range is 220–240° C., and the most preferred operating temperature is 220–225° C. Below 220° C., there is a tendency to produce slightly larger amounts of ethyl chloride. Above 240° C., larger amounts of more highly chlorinated ethanes are formed, so that 250° C., is an upper limit for obtaining good yields of 1,2-dichloroethane without excessive amounts of contaminants.

At 220–225° C., extremely high purity, 1,2-dichloroethane is obtained and the amount of 1,1,2-trichloroethane, which forms an azeotrope with 1,2-dichloroethane and is extremely difficult to separate from the latter is at a minimum.

The preferred pressure is 25–35 p.s.i.g. At these pressures the temperature-dew point relationships are optimum for avoiding condensation in the reactor and for obtaining the best conversion of ethylene to 1,2-dichloroethane.

The preferred catalysts are those having the defined particle size range and having impregnated thereon sufficient cupric chloride to provide 3.5 to 7% by weight of copper.

A corrosion study was made in the reactor described in Example 1. Data taken after 46 days of actual operation showed a depth loss per year of .026 to .037 inch for the carbon steel, .016 to .020 inch for Monel and .015 to .016 inch for nickel. These data show that by operating under conditions defined in this specification there is remarkably little corrosion, even of a carbon steel.

We claim:

1. In a method of preparing 1,2-dichloroethane by oxyhydrochlorination of ethylene employing a fluidized bed of a supported copper chloride catalyst, the improvement which comprises the successive steps of:

(1) passing the dry mixed vapors of hydrogen chloride, ethylene and an oxygen-containing gas preheated to a temperature in the range of 150° to 200° C. through said bed while maintaining in said bed a pressure and temperature selected in the ranges of from 10 to 50 p.s.i.g. and 220° to 240° C. so as to maintain said mixed vapors in said bed above the dew points of said dry mixed vapors and of said 1,2-dichloroethane product, said dry mixed vapors containing for every two moles of said hydrogen chloride from 1.02 to 1.20 moles of ethylene and 0.75 to 0.80 mole of oxygen, (2) hot quenching the effluent gases leaving said bed to a temperature in the range of 70° to 100° C. thereby to condense a portion of the water of reaction, most of any small remaining amount of hydrogen chloride and the bulk of the chloral by-product in said effluent gases, thus forming an aqueous solution of hydrogen chloride which is separated, (3) cold quenching the gases leaving the preceding hot quench step thereby to condense substantially all of the remaining water of reaction and most of the 1,2-dichloroethane product thereby forming and recovering liquid 1,2-dichloroethane product and an aqueous layer.

(4) recycling a portion of the aqueous hydrogen chloride solution from step 2 and, if required, a portion of the aqueous layer from step 3 to step 2 as a cooling medium in said hot quench step and recycling a portion of said aqueous layer from step 3 to step 3 as a cooling medium and recovering a portion of aqueous material from steps 2 and 3 as a net yield for disposal, (5) absorbing in an organic solvent for 1,2-dichloroethane any 1,2-dichloroethane remaining in the effluent gases from the preceding condensation step and separating and recovering as liquid product the absorbed 1,2-dichloroethane from the said solvent, (6) washing the liquid product from steps 3 and 5 with water, (7) neutralizing the net yield of aqueous material from step 4 and the wash water from step 6 before disposal, and (8) exhausting from the process any uncondensed material remaining after step 5.

References Cited

UNITED STATES PATENTS

| | | |
|---|---|---|
| 2,547,928 | 4/1951 | Davis et al. |
| 2,644,846 | 7/1953 | Johnson et al. |
| 2,699,988 | 1/1955 | McGrath et al. |
| 3,010,913 | 11/1961 | Price. |
| 3,042,728 | 7/1962 | Hirsh et al. |
| 3,055,955 | 9/1962 | Hodges. |
| 3,215,508 | 11/1965 | Piester. |
| 3,296,319 | 1/1967 | Bohl et al. |

LEON ZITVER, Primary Examiner

J. A. BOSKA, Assistant Examiner

UNITED STATES PATENT OFFICE
CERTIFICATE OF CORRECTION

Patent No. 3,488,398    Dated January 6, 1970

Inventor(s) Jerome W. Harpring and Arthur E. Van Antwerp

It is certified that error appears in the above-identified patent and that said Letters Patent are hereby corrected as shown below:

Column 2, line 46, "is" should read -- its --;
Column 2, line 46, "fluidzation" should read --fluidization--.

Column 3, line 55, "rerequisite" should read --the requisite--; line 69 "is is" should read --it is--.

Column 4, line 18 "passes" should read --pass--.

Column 7, line 11 after "cold quench" add --column--; line 35 "00.2%" should read --.002%--.

Column 8, line 2 "$CuCl_2 2H_2O$" should read --$CuCl_2 \cdot 2H_2O$--; line 34 "stoichiometrica mount" should read --stoichiometric amount--; line 75, last column in table under "Efficiency" should read --98.1 and 89.5-- instead of "98.5 and 89.1".

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents